United States Patent
Kobayashi et al.

(10) Patent No.: US 9,923,976 B2
(45) Date of Patent: Mar. 20, 2018

(54) CONTROL DEVICE AND CONTROL METHOD

(71) Applicant: FUJITSU LIMITED, Kawasaki-shi, Kanagawa (JP)

(72) Inventors: Masafumi Kobayashi, Kanazawa (JP); Naruhito Takiguchi, Kanazawa (JP); Yasuhito Honda, Kanazawa (JP); Keisuke Yoshida, Hakusan (JP); Kazushi Sasaki, Nonoichi (JP); Namiko Goto, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 232 days.

(21) Appl. No.: 14/813,632

(22) Filed: Jul. 30, 2015

(65) Prior Publication Data

US 2016/0088094 A1    Mar. 24, 2016

(30) Foreign Application Priority Data

Sep. 22, 2014 (JP) ................... 2014-192761

(51) Int. Cl.
  *H04L 29/08* (2006.01)
  *H04L 29/06* (2006.01)
(52) U.S. Cl.
  CPC .......... *H04L 67/143* (2013.01); *H04L 63/108* (2013.01); *H04L 63/08* (2013.01)
(58) Field of Classification Search
  CPC ... H04L 67/143; H04L 63/0272; H04L 63/08; H04L 63/108; H04L 67/14; G06F 21/31
  USPC ........................................................ 709/224
  See application file for complete search history.

(56) References Cited

U.S. PATENT DOCUMENTS

| 7,287,082 B1* | 10/2007 | O'Toole, Jr. ........ H04L 67/1008 709/223 |
| 7,624,437 B1* | 11/2009 | Fagundo ............. H04L 12/4641 713/153 |
| 9,462,014 B1* | 10/2016 | Lin ....................... H04L 63/308 |
| 2006/0026689 A1* | 2/2006 | Barker .................... G06F 21/31 726/26 |
| 2006/0123056 A1* | 6/2006 | Darbha .................... G06F 21/31 |
| 2012/0079582 A1* | 3/2012 | Brown ................. H04L 63/0807 726/7 |

(Continued)

FOREIGN PATENT DOCUMENTS

JP  2014-6718  1/2014

OTHER PUBLICATIONS

Matthew Guay, "Beginner: Automatically Lock Your Computer When You're Away" Sep. 2010, howtogeek.com, www.howtogeek.com/howto/29410/beginner-automatically-lock-your-computer-when-youre-away/.*

*Primary Examiner* — Ruolei Zong
(74) *Attorney, Agent, or Firm* — Staas & Halsey LLP (57) ABSTRACT

A control device includes: a memory; and a processor coupled to the memory and configured to: when detecting a new access from a communication device, based on session information including times of past accesses, compute a time period of a difference between a first time at which the new access is detected and a second time of a last access among the past accesses, and when the time period exceeds a given time interval, determine whether a session established with the communication device is valid for the new access in accordance with another time period over which the communication device is in locked state from the second time to the first time, the locked state not accepting an operation by a user.

9 Claims, 8 Drawing Sheets

(56) References Cited

U.S. PATENT DOCUMENTS

2014/0019752 A1* 1/2014 Yin .................... H04L 63/0435
713/155

* cited by examiner

| SESSION ID (31) | USER ID (32) | ··· | LAST ACCESS TIME (33) | TIME-OUT TIME (34) |
|---|---|---|---|---|
| A | tarou | | 2014/3/3 12:00 | 2014/3/3 12:05 |
| ↓ | | | | |
| A | tarou | | 2014/3/3 12:03 | 2014/3/3 12:08 |
| ↓ | | | | |
| A | tarou | | 2014/3/3 12:10 | 2014/3/3 12:15 |

CONTROL DEVICE AND CONTROL METHOD

CROSS-REFERENCE TO RELATED APPLICATION

This application is based upon and claims the benefit of priority of the prior Japanese Patent Application No. 2014-192761, filed on Sep. 22, 2014, the entire contents of which are incorporated herein by reference.

FIELD

The embodiment discussed herein is related to techniques for controlling access.

BACKGROUND

There is known a monitoring system for reducing the risk of, in response to the fact that a user leaves a terminal, a third party operating the terminal. For example, the related techniques are disclosed in Japanese Laid-open Patent Publication No. 2014-6718. In an idle monitoring system, a server device assumes that when a user authorized through authentication to use a terminal leaves his seat and is temporarily away from the terminal, a state in which the server device is not accessed (idle state) will occur, and monitors the time over which the idle state is retained. Then, if this idle state time exceeds a certain time period, the server device invalidates the authorization and, when the user next uses the terminal, requests the user to re-authenticate. Thus, it is possible to reduce the risk of, after the user has left his seat, a third party impersonating a valid user and operating the terminal.

SUMMARY

According to an aspect of the invention, a control device includes: a memory; and a processor coupled to the memory and configured to: when detecting a new access from a communication device, based on session information including times of past accesses, compute a time period of a difference between a first time at which the new access is detected and a second time of a last access among the past accesses, and when the time period exceeds a given time interval, determine whether a session established with the communication device is valid for the new access in accordance with another time period over which the communication device is in locked state from the second time to the first time, the locked state not accepting an operation by a user.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In the above monitoring system, the server device, when monitoring the idle state, does not take into account the state of a terminal to be monitored. That is, regardless of whether the terminal is in a locked state or in an unlocked state, the server device counts the idle state time and, when the idle state time exceeds a certain time period, determines that the authentication is invalid, and requests the user of the terminal to reauthenticate. Accordingly, despite the fact that a terminal, while being in a locked state, has been unable to be operated by a third party, when the terminal, which has not been operated for a given period of time, is next used, a request for re-authentication is made. This causes inconvenience.

Accordingly, in one aspect, an object of the techniques disclosed in this embodiment is to provide a monitoring system in which the state of a terminal is taken into account.

Hereinafter, an embodiment of the present disclosure will be described with reference to the accompanying drawings. It is to be noted that, in the present specification and drawings, elements having substantially the same functional configuration are denoted by the same reference numeral and thus redundant description thereof is omitted.

[Overall Configuration of Monitoring System]

Figure 1:
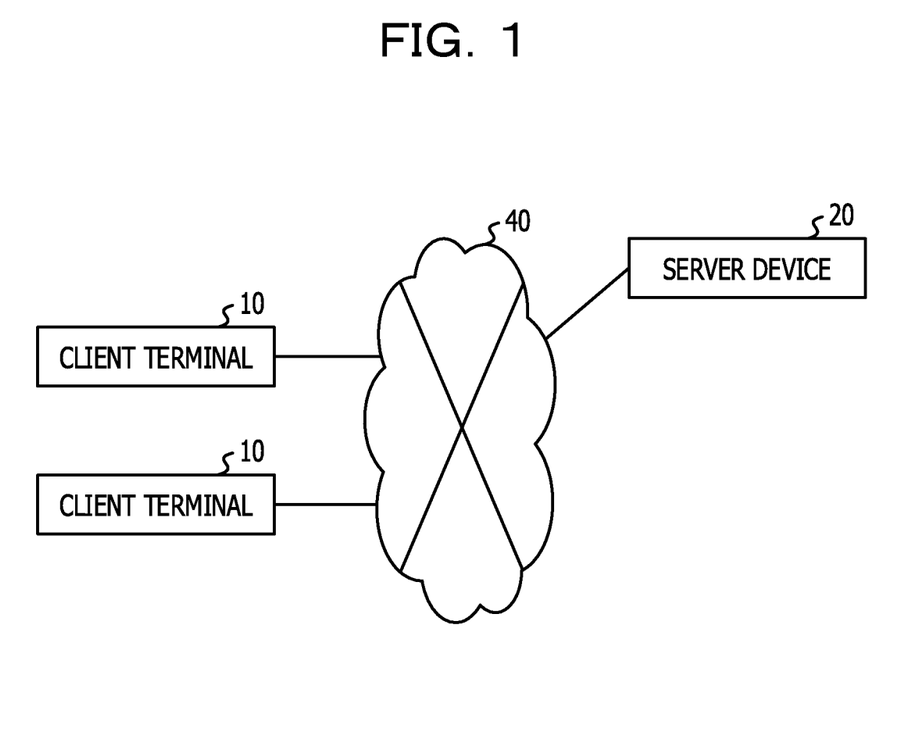
FIG. 1 is a diagram illustrating an example of an overall configuration of a monitoring system according to an embodiment.

Initially, an example of an overall configuration of a monitoring system according to an embodiment of the present disclosure will be described with reference to FIG. 1. FIG. 1 illustrates an example of an overall configuration of a monitoring system according to an embodiment. The monitoring system according to this embodiment is a client-server system including a plurality of client terminals 10 and a server device 20. The plurality of client terminals 10 and the server device 20 are coupled via a network 40 of the Internet, a local area network (LAN), and so on.

The client terminal 10 accesses the server device 20, makes a request for desired resource information from resources provided by the server device 20, and acquires the desired resource information from the server device 20. The client terminal 10 may be any electronic device having a communication function regardless of the number and types of the electronic devices. The client terminal 10 may be, for example, a smart phone, a portable telephone, a personal digital assistance (PDA), a tablet-type device, a notebook personal computer (PC), a desktop PC, a portable-type music instrument, a game device, an automated teller machine (ATM), a projector, a business machine, or a home appliance.

The server device 20, when a request for resources is made by the client terminal 10, authenticates the client terminal 10 and delivers the requested resource information to the successfully authenticated client terminal 10. Examples of the server device 20 include, for example, a web server, an application server, a database server, and the like.

The server device 20 supposes that when a user authorized through authentication to use the client terminal 10 leaves his seat and is temporarily away from the terminal, a state in which the server device 20 is not accessed (hereinafter referred to as am "idle state") occurs, and monitors the time over which the idle state is retained (hereinafter referred to as the "idle state time"). Then, if the idle state exceeds a certain time period, the server device 20 invalidates the authentication and, when the user next uses the client terminal 10, makes a request to the user for re-authentication. This may reduce the risk of, after the user has left his seat, a third party impersonating a valid user and operating the client terminal 10.

Therefore, the server device 20 monitors whether or not the client terminal 10 is in the idle state. The idle state time may be computed by using a difference in time period from a last access time, which is a time at which the client terminal 10 last accessed the server device 20, to a current access time. The idle state time is counted and managed by the server device 20.

Using the idle state time, an access retain time, and the time over which the client terminal 10 is in a locked state (locked state time), the server device 20 determines whether or not re-authentication of the client terminal 10 has to be performed by the user. The access retain time is predetermined by an administrator who manages the server device 20, and is used for determining whether or not, regarding access from the client terminal 10, re-authentication of the client terminal 10 has to be performed by the user. The server device 20 is an example of an information processing device that controls access from the client terminal 10 using the idle state time, the access retain time, and the locked state time.

The locked state of the client terminal 10 is a state in which the client terminal 10 is unable to be operated by a third party. Consequently, the locked state of the client terminal 10 is a state in which, after the user has left his seat, a third party is unable to impersonate a valid user and operate the client terminal 10. The client terminal 10 is set to the locked state by a lock operation of the user and is set to the unlocked state by an unlock operation of the user.

[Functional Configuration of Server Device]

Figure 2:
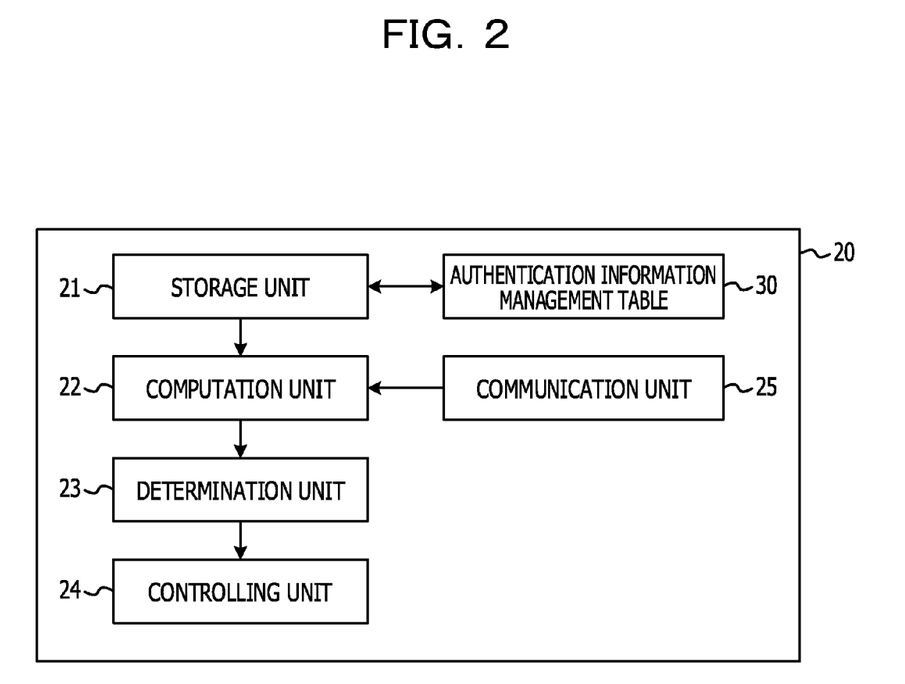
FIG. 2 is a diagram illustrating an example a functional configuration of a server device according to the embodiment.

Next, an example of a functional configuration of the server device 20 according to the embodiment will be described with reference to FIG. 2. FIG. 2 illustrates an example of a functional configuration of the server device 20 according to this embodiment. The server device 20 includes a storage unit 21, a computation unit 22, a determination unit 23, a controlling unit 24, and a communication unit 25.

Figure 3:
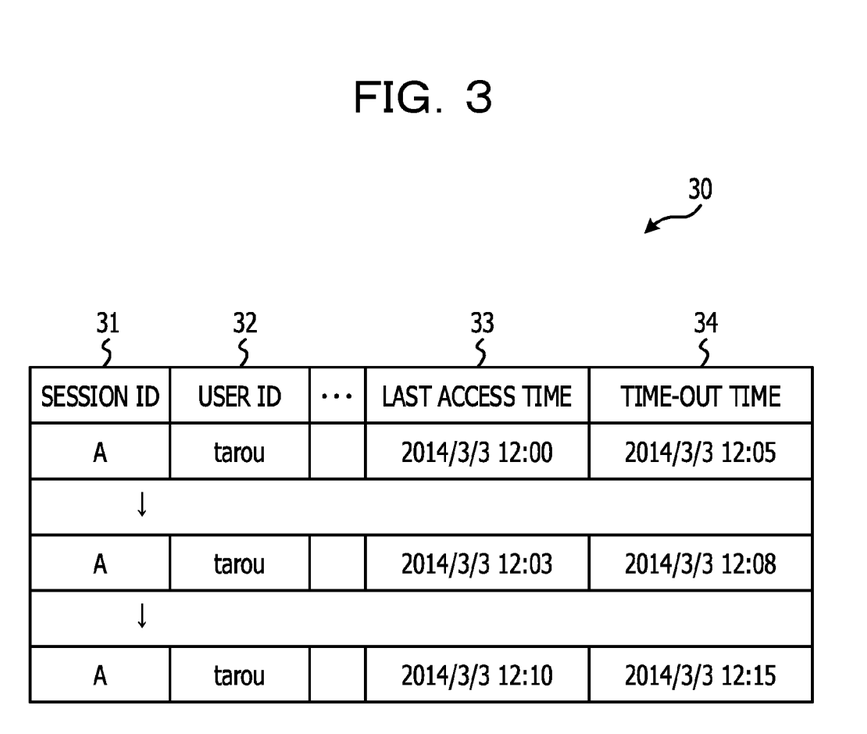
FIG. 3 is a diagram depicting an example of an authentication information management table according to the embodiment.

The storage unit 21 stores, in an authentication information management table 30, session information that includes times at which access from the client terminal 10 is detected, and authentication information. The authentication management table 30, as depicted in FIG. 3, stores respective pieces of information of a session identifier (ID) 31, a user ID 32, last access time information 33, and time-out time information 34.

The session ID 31 is information, generated at a first access from the client terminal 10, for identifying a session responding to the access. The session ID 31 is key information for accessing session information stored in the authentication information management table 30. The session ID 31 is transmitted at the first access from the server device 20 to the client terminal 10 that has been successfully authenticated. The client terminal 10 saves the session ID and, at a second or later access, transmits the session ID to the server device 20. Thus, the server device 20 manages sessions with the client terminal 10.

The user ID 32 is identification information of a user. The session ID 31 and the user ID 32 are an example of the authentication information. In this embodiment, the user ID 32 is used as identification information of a user; however, the identification information of a user is not limited to the user ID 32 and a password. Other examples of the identification information of a user include fingerprints, hand geometry, retinas, irises, facial images, blood vessels, sounds, and the like used for biometrics.

The last access time information 33 stores information on the date and time at which the server device 20 detects access from the client terminal 10. Each time the server device 20 is accessed by the client terminal 10, the storage unit 21 detects a last access time and stores the last access time as the last access time information 33 in the authentication information management table 30.

The time-out time information 34 indicates a time at which the time period of validity of a session expires, while the server device 20 has not been accessed since the last access time 33, (hereinafter referred to also as a "time-out time"). In this embodiment, the time-out period is set to "five minutes". Consequently, the time-out time information 34 is set to five minutes after the last access time 33 and is stored in the authentication information management table 30. Note that the time-out time information 34 does not have to be stored in the authentication information management table 30.

The controlling unit 24 controls the entirety of the server device 20. The controlling unit 24 acquires resource information for which a request has been made by the client terminal 10 and transmits the resource information via the communication unit 25 to the client terminal 10.

The computation unit 22 computes an idle state time using the last access time information 33 stored in the authentication information management table 30. The computation unit 22 computes a time period from the time of the last access time information 33 to the current access time as an idle state time. For example, in the case where the access time of the previous access stored in the authentication information management table 30 is "2014/3/3 12:03" and the access time of the current access is "2014/3/3 12:10", the calculation unit 22 regards a difference of seven minutes as an idle state time.

The determination unit 23 determines whether or not the computed idle state time exceeds the access retain time. If the determination unit 23 determines that the idle state time exceeds the predetermined access retain time, the computation unit 22 computes, in the time period from the time of the last access time information 33 to the current access time (the idle state time), the locked state time during which the client terminal 10 does not accept an operation carried out by the user. At this point, using information on a lock start time and a lock end time transmitted from the client terminal 10, the computation unit 22 computes a time period obtained by subtracting the received lock start time from the received lock end time, as the locked state time. The computation unit 22 computes a time period obtained by subtracting the locked state time from the idle state time.

If the length of the time period obtained by subtracting the locked state time from the idle state time exceeds the access retain time, the determination unit 23 makes a request to the client terminal 10 for re-authentication. Thus, in the monitoring system according to this embodiment, regarding a user of the client terminal 10 who, after successful authentication of the client terminal 10, has not accessed the server device 20 for a certain time period that remains after subtracting the locked state time from the idle state time, the server device 20 causes the user to automatically enter a sign-off state and requests the user to re-authenticate. This makes it possible to reduce the risk of, while the user is away from his seat, a third party impersonating a valid user and operating the client terminal 10.

On the other hand, if the length of the time period obtained by subtracting the locked state time from the idle state time does not exceed the access retain time, the determination unit 23 determines that the above session is valid for access from the client terminal 10. In this case, without making a request to the client terminal 10 for re-authentication, the server device 20 transmits, in response to a request for resources of the client terminal 10, the desired resource information to the client terminal 10.

While being in a locked state, the client terminal 10 is in a state in which the client terminal 10 is unable to be operated by a third party and the security of the client terminal 10 is maintained. For this reason, when using the client terminal 10 that has not been operated for the access retain time or more, the determination unit 23 takes into account the locked state and determines whether or not re-authentication has to be performed. That is, the determination unit 23 compares the length of the time period remaining after subtracting the locked state time from the idle state time of the client terminal 10 with the access retain time. If the time period remaining after subtracting the locked state time from the idle state time is longer than the access retain time, the determination unit 23 determines that re-authentication of the client terminal 10 has to be performed, when the client terminal 10, after having not been operated, is used again. On the other hand, if the time period remaining after subtracting the locked state time from the idle state time is shorter than the access retain time, the determination unit 23 determines that re-authentication of the client terminal 10 is unnecessary, when the client terminal 10, after having not been operated, is used again.

Thus, it is possible to provide a monitoring system in which the security conditions of the client terminal 10 are taken into account and, when a user uses the client terminal 10, an authentication process is not excessively performed and thus the user easily uses the client terminal 10.

Note that information on a time period of the locked state of the client terminal 10 is managed on the side of the client terminal 10 and is transmitted from the client terminal 10 to the server device 20. The server device 20 monitors the idle state time for each client terminal 10 and performs access control of the client terminal 10 using the information on a time period of the locked state of which the server device 20 is notified by the client terminal 10.

[Access Control Process]

Figure 4:
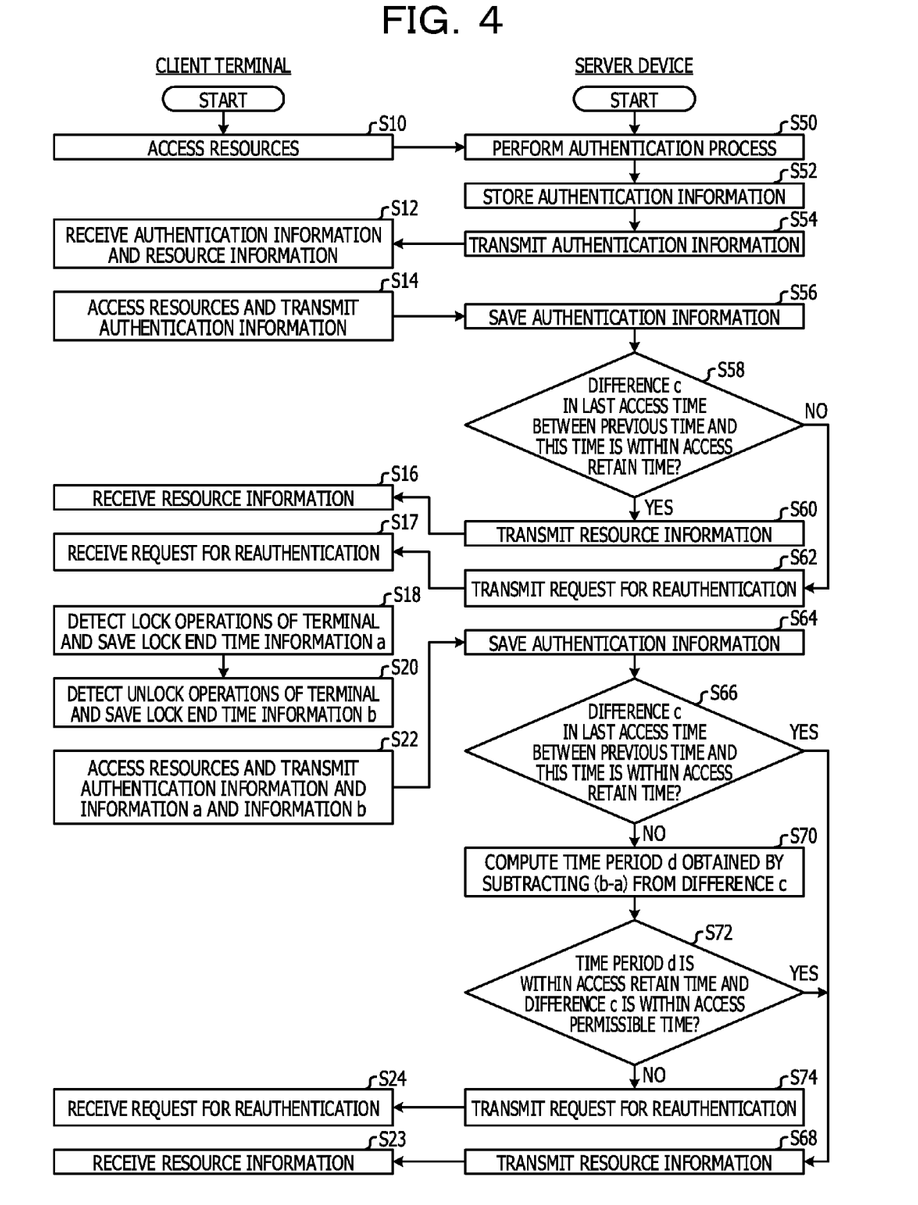
FIG. 4 is a flowchart illustrating an example of an access control process according to the embodiment.
Figure 5:
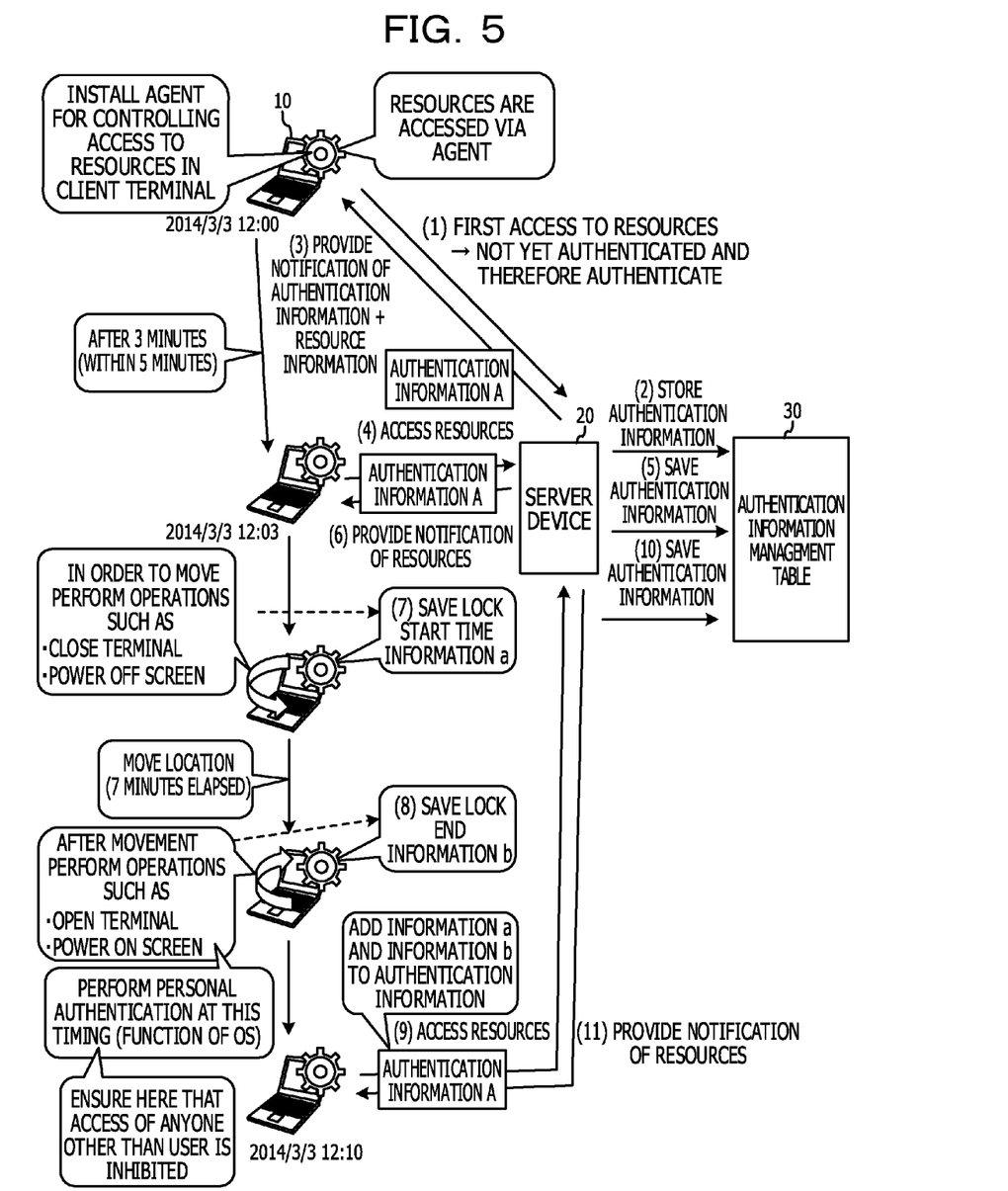
FIG. 5 is a diagram for explaining the access control process according to the embodiment.

Next, an access control process according to this embodiment will be described with reference to FIG. 4 and FIG. 5. FIG. 4 is a flowchart illustrating an example of an access control process according to this embodiment. FIG. 5 is a diagram for explaining the access control process according to this embodiment. Note that operations of the client terminal 10 are illustrated on the left side of FIG. 4, and operations of the server device 20 are illustrated on the right side of FIG. 4.

It is assumed that an agent that controls access to resources of the server device 20 is installed in the client terminal 10. The access control process according to this embodiment assumes a situation in which a user moves while carrying the client terminal 10. This is preferable for the case where the client terminal 10 is a mobile terminal such as a smartphone, a tablet terminal, or a notebook PC.

In this case, using the client terminal 10 that is a mobile terminal, a user accesses the server device 20 for which authentication is requisite, and makes a request for desired resources. The user moves with the client terminal 10 that has been successfully authenticated by the server device 20. For example, the case where a user moves from the office to a customer, the case where a user moves between meeting rooms, and the like are assumed.

During movement, the client terminal 10 has a locked screen, which is different from a normal operation screen. For example, in the case where the client terminal 10 is a notebook PC, it is assumed, for example, that, when a user closes the notebook PC, the client terminal 10 enters a suspended state and the screen is locked. After movement, the user resumes work at the movement destination by using the client terminal 10 and accesses the server device 20 as appropriate in order to acquire resources.

(First Time Access)

In the situation described above, once the access control process according to this embodiment starts, the client terminal 10 accesses the server device 20 and makes a request for resources (step S10). The communication unit 25 receives the request for resources from the client terminal 10. This accessing is a first time access from the client terminal 10 and authentication has not yet been granted, and therefore the determination unit 23 performs an authentication process (step S50: refer to (1) of FIG. 5). As an example of the authentication process, the determination unit 23 determines whether or not a user ID input matches a user ID registered in advance. If it is determined that the input user ID matches the user ID registered in advance, the determination unit 23 determines that authentication of the client terminal 10 succeeds. If it is determined that the input user ID does not match the user ID registered in advance, the determination unit 23 determines that authentication of the client terminal 10 fails. However, the determination unit 23 does not have to perform the authentication method described above and may perform authentication of a user through, for example, biometrics or another authentication process.

When authentication succeeds, the storage unit 21 stores authentication information in the authentication information management table 30 (step S52: refer to (2) of FIG. 5). As a result, the session ID 31 and the user ID 32 are saved in the authentication information management table 30. The last access time information 33 and the time-out time information 34 are also stored in the authentication information management table 30. Note that if authentication of the client terminal 10 fails, the communication unit 25 notifies the client terminal 10 of the failure of authentication.

The controlling unit 24 acquires the requested resource information in response to the request of the authenticated client terminal 10. The communication unit 25 transmits the authentication information (the session ID 31) and the acquired resource information (step S54: refer to (3) of FIG. 5). The client terminal 10 receives the authentication information and the resource information (step S12). The client terminal 10 stores the session ID 31 as authentication information used during the next access to the server device 20, in a predetermined storage area.

(Second Time Access)

The client terminal 10 illustrated in FIG. 5 accesses resources for the second time (2014/3/3 12:03) three minutes after the first access (2014/3/3 12:00) and transmits a request for resources and authentication information (step S14: refer to (4) of FIG. 5).

The communication unit 25 receives the request for resources and the authentication information from the client terminal 10. The storage unit 21 saves the received authentication information in the authentication information management table 30 (step S56: refer to (5) of FIG. 5). The storage unit 21 also saves the last access time information 33, which is information on a time at which the second access to resources is detected, and the time-out time information 34 in accordance with the last access time information 33 in the authentication information management table 30.

Next, the determination unit 23 determines whether or not a difference c in the last access time between the previous access and this access is within the access retain time (step S58). If the determination unit 23 determines that the difference c is within the access retain time, the controlling unit 24 acquires the requested resource information. The communication unit 25 transmits the acquired resource information to the client terminal 10 (step S60: refer to (6) of FIG. 5).

On the other hand, if, in step S58, the determination unit 23 determines that the difference c is not within the access retain time, the determination unit 23 transmits a request for re-authentication (step S62). Note that, at the second access, the communication unit 25 does not receive lock start time information a or lock end time information b from the client terminal 10. For this reason, the determination unit 23 determines that a locked state does not occur in the client terminal 10. As a result, at the second access, control over a determination for re-authentication in consideration of the locked state is not performed.

In response to step S60, the client terminal 10 receives the resource information (step S16). In response to step S62, the client terminal 10 also receives the request for re-authentication (step S17).

When the client terminal 10 receives a request for re-authentication, the user inputs the user ID again. Thereby, if the client terminal 10 is successfully authenticated, a new session is established. The new session is given a new session ID.

(Lock Operations)

When the user performs lock operations of the client terminal 10, the client terminal 10 (agent) detects the lock operations and saves the detection time as the start time information a (step S18: refer to (7) of FIG. 5). The lock operations of the client terminal 10 performed by the user here include an operation of closing the screen of the client terminal 10 and powering off the client terminal 10.

(Unlock Operations)

In FIG. 5, the user moves with the client terminal 10 remaining in the locked state and performs unlock operations seven minutes after the start of the locked state. The client terminal 10 (agent) detects the unlock operations and saves the detection time as the lock end time information b (step S20: refer to (8) of FIG. 5). The unlock operations of the client terminal 10 performed by the user here include an operation of opening the screen of the client terminal 10 and an operation of powering on the client terminal 10.

During the unlock operations of the client terminal 10, the user inputs a user ID (and a password) on the log-in screen of the client terminal 10. Thus, personal authentication of the user is performed by the client terminal 10. As a result, it is possible to ensure that after the client terminal 10 is unlocked, only a valid user is authorized to use the client terminal 10.

(Third Time Access)

Thereafter, when accessing resources for the third time (2014/3/3 12:10), the client terminal 10 transmits a request for resources and authentication information (step S22: refer to (9) of FIG. 5). At this point, the client terminal 10 adds the lock start time information a and the lock end time information b to the authentication information.

The communication unit 25 receives the request for resources and the authentication information from the client terminal 10. The storage unit 21 saves the received authentication information in the authentication information management table 30 (step S64: refer to (10) of FIG. 5). In response to this third time access to resources, the storage unit 21 saves the last access time information 33 and the time-out time information 34 in the authentication information management table 30.

Next, the determination unit 23 determines whether or not the difference c in the last access time between the previous access and this access is within the access retain time (step S66). If the determination unit 23 determines that the difference c is within the access retain time, the controlling unit 24 acquires the requested resource information in response to the request of the authenticated client terminal 10. The communication unit 25 transmits the acquired resource information (step S68: refer to (11) of FIG. 5).

On the other hand, if, in step S66, the determination unit 23 determines that the difference c is not within the access retain time, the process proceeds to step S70, and, using the lock start time information a and the lock end time information b received from the client terminal 10, the computation unit 22 computes the time period of a difference (b−a) representing the locked state time. The computation unit 22 computes a time period d obtained by subtracting the time period of the difference (b−a) representing the locked state time from the time period of the difference c representing the idle state time (step S70).

Next, the determination unit 23 determines whether or not the time period d obtained by subtracting the locked state time from the idle state time is within the access retain time and the difference c is within a predetermined access permissible time (step S72). If the determination unit 23 determines that the difference d is within the access retain time and the difference c is within the predetermined access permissible time, the controlling unit 24 acquires the resource information requested by the client terminal 10. The communication unit 25 transmits the acquired resource information (step S68: refer to (11) of FIG. 5).

If the determination unit 23 determines that the difference d is not within the access retain time or the difference c is not within the predetermined permissible time period, the communication unit 25 transmits a request for re-authentication (step S74). In this way, during the third access, the communication unit 24 receives the lock start time information a and the lock end time information b from the client terminal 10. Therefore, the determination unit 23 determines that a locked state occurs in the client terminal 10 and controls a determination for re-authentication in consideration of the locked state.

Note that, in step S72, the determination unit 23 determines whether or not the time period d obtained by subtracting the locked state time from the idle state time is within the access retain time, and does not have to make a determination as to whether or not the difference c mentioned above is within the predetermined access permissible time. However, it is preferable that a determination be made as to whether or not the difference c mentioned above is within the predetermined access permissible time.

The reason for this is considered that when, although the length of the time period of the difference d obtained by subtracting the time period of the locked state time (b–a) from the time period of the difference c (that is, the idle state) between the last access time and the current access time does not exceed the idle retain time, the time period of the difference c (idle state) between the last access time and the current access time exceeds the predetermined access permissible time, the time over which the user is away from his seat is long and thus the risk of a third party impersonating a valid user and operating the client terminal 10 is high. Therefore, in such a case, it is preferable that a request be made for re-authentication. The access permissible time may be set for each monitoring system.

In response to step S68, the client terminal 10 receives the resource information (step S23). In response to step S74, the client terminal 10 also receives a request for re-authentication (step S24).

Examples of Advantages

Idle-time monitoring assumes a situation where the user who has successfully authenticated leaves his seat in a state where anyone is able to operate the client terminal 10. There are some cases where when, after the client terminal 10 has been locked, the user unlocks the client terminal 10 and starts operations, personal authentication is requisite. In such cases, the client terminal 10, while being in a locked state, is in a state of being inoperable by a third party, and the security of the client terminal 10 is maintained. Consequently, if the locked state time is within the idle state time monitored by the server device 20, the time period remaining after subtracting the locked state time from the idle state time is the time during which a third party is substantially able to operate the terminal 10, and thus this remaining time period is considered to be the time to be monitored for idle-time monitoring.

From the above, in the monitoring system according to this embodiment, the time period remaining after subtracting the locked state time from the idle state time is the time to be monitored for idle-time monitoring. If the time period remaining after subtracting the locked state time from the idle state time exceeds a certain time period, the authentication is invalidated and a request for re-authentication is made when the client terminal 10 is next used. Thus, when, although the idle state time exceeds the access retain time while the user is away from his seat, the time period remaining after subtracting the locked state time from the idle state time does not exceed the access retain time, it is possible to avoid a situation where the user has to re-authenticate "after returning to his seat". Thus, it is possible to save the user time and energy for inputting a user ID and the like for re-authentication. As a result, a monitoring system in which the security of the client terminal 10 is taken into account and that enables the user to easily use the client terminal 10 may be provided.

Modification

[Access Control Process]

Figure 6:
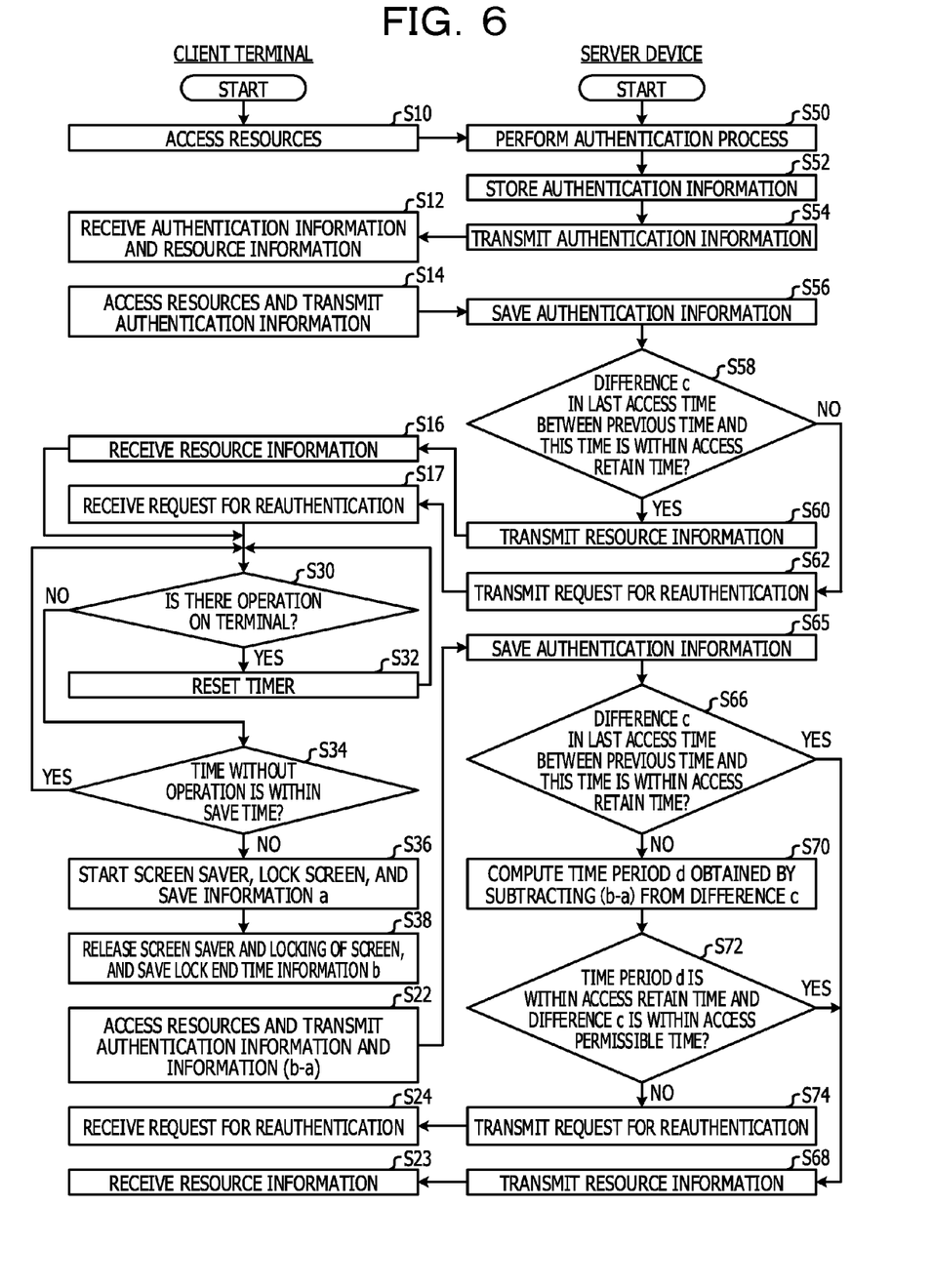
FIG. 6 is a flowchart illustrating an example of the access control process according to a modification of the embodiment.
Figure 7:
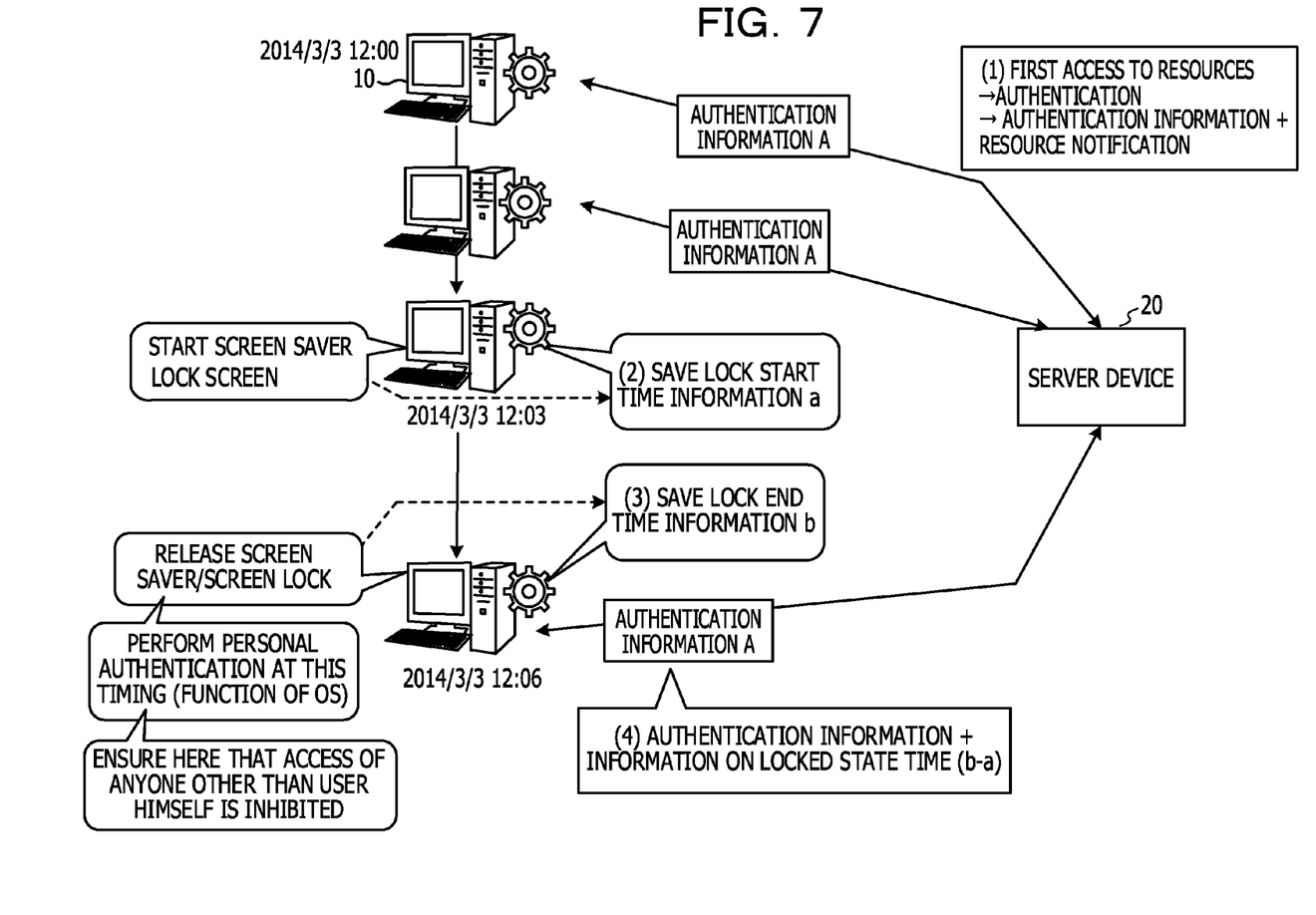
FIG. 7 is a diagram for explaining the access control process according to the modification of the embodiment.

Next, an access control process according to a modification of the embodiment described above will be described with reference to FIG. 6 and FIG. 7. FIG. 6 is a flowchart illustrating an example of an access control process according to a modification of this embodiment. FIG. 7 is a diagram for explaining the access control process according to the modification of this embodiment. Note that operations of the client terminal 10 are illustrated on the left side of FIG. 6 and operations of the server device 20 are illustrated on the right side of FIG. 6. Note also that the same processing operations as those of the access control process (FIG. 4) according to the above embodiment are denoted by the same step numbers.

The access control process according to the modification of this embodiment assumes, for example, the case where after personal authentication of a user is performed with the client terminal 10 such as a desktop PC and then the user leaves his seat, and thus the client terminal 10 enters a suspended state, the user returns to his seat, resumes work, and accesses resources of the server device 20.

(First Access)

In the above situation, once the access control process according to this modification starts, the client terminal 10 transmits a request for resources provided by the server device 20 at 2014/3/3 12:00 (step S10: refer to (1) of FIG. 7). The communication unit 25 receives a request for resources from the client terminal 10. This access is first time access from the client terminal 10 and authentication has not yet been granted and therefore the determination unit 23 performs an authentication process (step S50: refer to (1) of FIG. 7). If authentication of the client terminal 10 succeeds, the storage unit 21 stores authentication information in the authentication information management table 30 (step S52). Thus, the session ID 31 and the user ID 32 are saved in the authentication information management table 30. The last access time information 33 and the time-out time information 34 are stored in the authentication information management table 30. The controlling unit 24 acquires the requested resource information in response to the request of the authenticated client terminal 10. The communication unit 25 transmits the authentication information (the session ID 31) and the acquired resource information (step S54: refer to (3) of FIG. 5). The client terminal 10 receives the authentication information and the resource information (step S12). The client terminal 10 saves the session ID 31 as authentication information used during the next access to the server device 20, in a predetermined storage area.

(Second Access)

The client terminal 10 accesses resources for the second time and transmits a request for resources and authentication information (step S14). The communication unit 25 receives the request for resources from the client terminal 10. The storage unit 21 saves the received authentication information in the authentication information management table 30 (step S56). Next, the determination unit 23 determines whether or not the difference c in the last access time between the previous access and this access is within the access retain time (step S58). If the determination unit 23 determines that the difference c is within the access retain time, the controlling unit 24 acquires resource information in response to the request from the authenticated client terminal 10. The communication unit 25 transmits the acquired resource information (step S60). On the other hand, if, in step S58, the determination unit 23 determines that the difference c is not within the access retain time, the process proceeds to step S62 where the determination unit 23 transmits a request for re-authentication (step S62).

In response to step S60, the client terminal 10 receives the resource information (step S16). In response to step S62, the client terminal 10 also receives the request for re-authentication (step S17).

(From No Operation to Operation)

After processing of steps S16 and S17, the client terminal 10 (agent) determines whether or not there is an operation on the client terminal (step S30). If the client terminal 10 determines that there is an operation on the client terminal 10, the client terminal 10 resets a timer (step S32). If the client terminal 10 determines that there is no operation on the client terminal 10, the client terminal 10 determines whether or not the time over which the client terminal 10 is not operated is within a save time determined in advance (step S34). The save time represents a period of time with no operation on the client terminal 10 that has to be taken for starting a screen saver and locking the screen.

If the client terminal 10 determines that the time over which the client terminal 10 is not operated is within the save time, the client terminal 10 returns to step S30 and repeats the processing of steps S30 to S34. If the client terminal 10 determines that the time over which the client terminal 10 is not operated exceeds the save time, the client terminal 10 starts the screen saver and locks the screen (step S36). The client terminal 10 (agent) detects this and saves the lock start time information a indicating the time at which locking starts (refer to (2) of FIG. 7).

When the client terminal 10 is operated for the next time, the client terminal 10 stops the screen saver and unlocks the screen (step S38). The client terminal 10 (agent) detects this and saves the lock end time information b indicating the time at which the screen is unlocked (refer to (3) of FIG. 7).

During an unlock operation of the client terminal 10, the user inputs the user ID (and the password) on the log-in screen of the client terminal 10. Thus, personal authentication of the user is performed by the client terminal 10. As a result, it is possible to ensure that only a valid user is authorized to use the client terminal 10 after the client terminal 10 is unlocked.

(Third Time Access)

The client terminal 10 accesses resources for the third time at 2014/3/3 12:06 and transmits a request for resources and authentication information (step S22). At this point, the client terminal 10 transmits, together with authentication information, the locked state time (b–a) representing a difference between the lock start time information a and the lock end time information b (refer to (4) of FIG. 7). In this modification, the locked state time (b–a) is computed by the client terminal 10.

The communication unit 25 receives the request for resources from the client terminal 10. The storage unit 21 saves the received authentication information in the authentication information management table 30 (step S65). The storage unit 21 also saves the last access time information 33 and the time-out time information 34 in the authentication information management table 30 in response to this third time access to resources.

Next, the determination unit 23 determines whether or not the difference c in the last access time between the previous time and this time is within the access retain time (step S66). If the determination unit 23 determines that the difference c is within the access retain time, the controlling unit 24 acquires the requested resource information in response to the request of the authenticated client terminal 10. The communication unit 25 transmits the resource information (step S68).

On the other hand, if, in step S66, the determination unit 23 determines that the difference c is not within the access retain time, the determination unit 23 proceeds to step S70 and, using information on the locked state time (b–a) received from the client terminal 10, computes the time d obtained by subtracting the difference (b–a) representing the locked state from the time of the difference c representing the idle state time.

Next, the determination unit 23 determines whether or not the time d obtained by subtracting the locked state time from the idle state time is within the access retain time and the above difference c is within the access permissible time (step S72). If the determination unit 23 determines that the difference d is within the access retain time and that the difference c is within the access permissible time, the controlling unit 24 acquires resource information requested by the client terminal 10. The communication unit 25 transmits the resource information (step S68).

If the determination unit 23 determines that the difference d is not within the access retain time or that the difference c is not within the predetermined access permissible time, the communication unit 25 transmits a request for re-authentication.

In response to step S68, the client terminal 10 receives the resource information (step S23). In response to step S74, the client terminal 10 also receives the request for re-authentication (step S24).

Examples of Advantages

From the above description, in the monitoring system according to the modification of this embodiment, the time period remaining after subtracting the locked state time from the idle state time is the time to be monitored for idle-time monitoring, and, if the remaining time period exceeds a certain time period, authentication is invalidated and a request is made for re-authentication when the client terminal 10 is next used. Thus, when, although the idle state time exceeds the access retain time while the user is away from his seat, the time period remaining after subtracting the locked state time from the idle state time does not exceed the access retain time, it is possible to avoid the situation where the user has to re-authenticate "after unlocking". Thus, it is possible to save user time and energy for inputting the user ID and the like for re-authentication. As a result, a monitoring system in which the security of the client terminal 10 is taken into account and that enables the user to easily use the client terminal may be provided.

Furthermore, according to this modification, on the side of the client terminal 10, the locked state time (b–a) is computed from the detected lock state time information a and the lock end time information b, and information on the computed locked state time (b–a) is transmitted to the server device 20. Thus, the processing load on the server device 20 may be reduced.

(Hardware Configuration Example)

Figure 8:
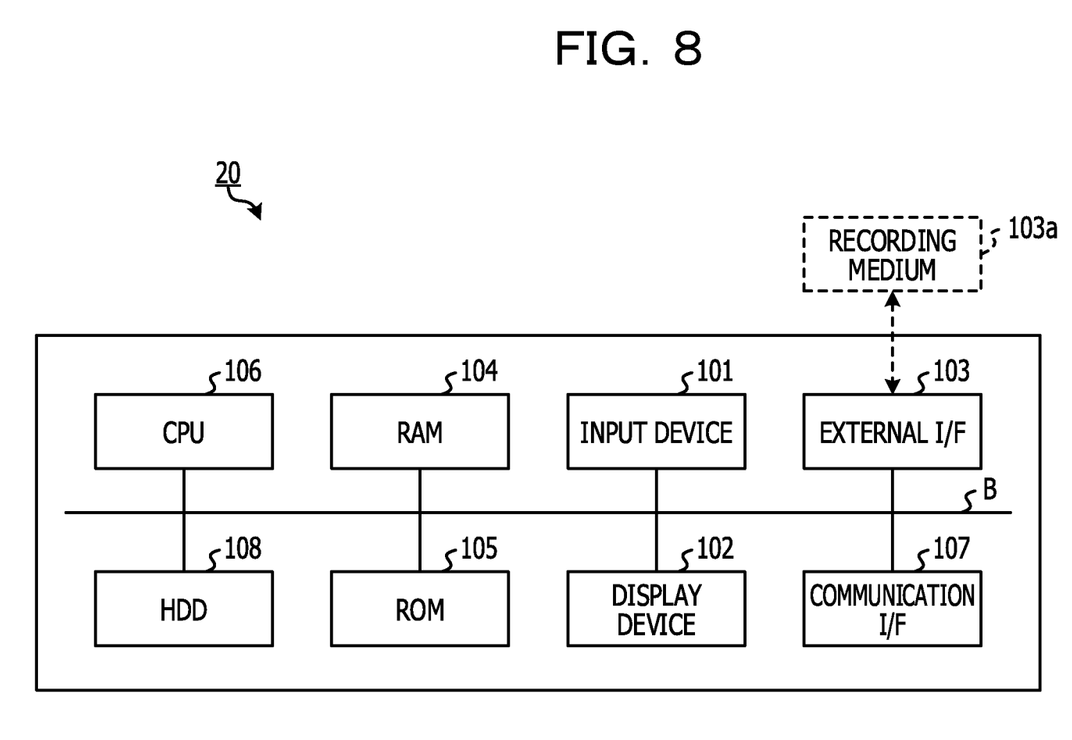
FIG. 8 is a diagram illustrating a hardware configuration example of the server device according to the embodiment.

Finally, a hardware configuration example of the server device 20 according to this embodiment and the modification thereof will be described with reference to FIG. 8. FIG. 8 is a diagram illustrating a hardware configuration example of the server device 20 according to this embodiment and the modification thereof.

The server device 20 includes an input device 101, a display device 102, an external interface (I/F) 103, a random access memory (RAM) 104, a read only memory (ROM) 105, a central processing unit (CPU) 106, a communication I/F 107, and a hard disk drive (HDD) 108. The components are mutually coupled via a bus B.

The input device 101 includes a keyboard, a mouse, and so on and is used for inputting each operation signal to the server device 20. The display device 102 includes a signage unit (display) and so on and displays various processing results.

The communication I/F 107 is an interface that couples the server device 20 to a network. Thus, the server device 20 performs data communication via the communication I/F 107 to the client terminal 10.

The HDD 108 is a nonvolatile storage device in which programs and data are stored. Examples of the stored programs and data include basic software that controls the entire device and application software. For example, various kinds of data and programs, and so on are stored in the HDD 108.

The external I/F 103 is an interface with an external device. The external device is a recording medium 103a or the like. Thus, the server device 20 may read from and/or write to the recoding medium 103a via the external I/F 103. Examples of the recording medium 103a include a compact disk (CD) and a digital versatile disk (DVD), and a secure digital (SD) memory card and a universal serial bus (USB) memory.

The ROM 105 is a nonvolatile semiconductor memory (storage device) capable of retaining internal data when powered off. Stored in the ROM 105 are programs and data for network setting and the like. The RAM 104 is a nonvolatile semiconductor memory (storage device) that temporarily stores programs and data. The CPU 106 is a computing device that implements control of the entire device and functions included in the device by reading programs and data from the above storage devices (such as, for example, the "HDD 108" and the "ROM 105") into the RAM 104 and executing processes.

With the hardware configuration described above, the server device 20 according to this embodiment may perform the idle monitoring process and the access control process for the client terminal 10. For example, the CPU 106 performs the idle monitoring process and the access control process by using data and programs stored in the ROM 105 and the HDD 108. As a result, in this embodiment and the modification thereof, resources provided by the server device 20 may be provided to a valid user. Furthermore, at this point, the environments in which the security of the client terminal 10 is taken into account and that enable a user to easily use the client terminal 10 may be provided. Note that the authentication information management table 30 may be stored in the RAM 104, the HDD 108, or a server or the like in the cloud coupled via a network to the server device 20.

The access control program, the access control method, and the information processing device have been so far described through the above embodiment. However, the access control program, access control method, and information processing device according to the present disclosure are not limited to the above embodiment and may be modified and improved in various manners without departing from the scope of the present disclosure. Furthermore, items described in the above plurality of embodiments may be combined to the extent not inconsistent therewith. Furthermore, the functions of components of the above server device 20 may be configured by hardware, may be configured by software, and may be configured by combining hardware and software.

Furthermore, for example, the configuration of the monitoring system according to the above embodiment is exemplary and does not limit the scope of the present disclosure, and it is to be understood that there are various system configuration examples in accordance with applications and objects.

Furthermore, for example, the system form in which a plurality of client terminals 10 and the server device 20 are mutually coupled via the network 40 is one form of the monitoring system according to this embodiment, and the monitoring system is not limited to this. For example, the number of server devices 20 included in the monitoring system according to this embodiment may be one or two or more. When a plurality of server device 20 are placed, the idle monitoring process and the access control process of the client terminal 10 may be performed in such a manner as to be distributed across the plurality of server devices 20. Note that, in accordance with the applications and purposes, the processing functions of the plurality of server devices 20 may be selectively integrated into one server device 20.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control device comprising:
    a memory; and
    a processor coupled to the memory and configured to:
        when detecting a new access from a communication device, based on session information including times of past accesses, determine an idle time period, the idle time period being a difference between a first time at which the new access is detected and a second time of a last access among the past accesses,
        determine a locked state time, the locked state time being a time interval the communication device is in a locked state between the second time and the first time,
        determine an access retain time, the access retain time being a predetermined time interval,
        determine a difference between the idle time period and the locked state time, and
        determine a session established with the communication device is valid for the new access when the difference between the idle time period and the locked state time is less than the access retain time.

2. The control device according to claim 1, wherein
    the processor is configured to, when the difference between the idle time period and the locked state time is greater than the access retain time, determine that the session is not valid for the new access.

3. The control device according to claim 1, wherein
    the processor is configured to receive information indicating the access retain time and store the session information including the information.

4. A control device that manages a session with a communication device, comprising:
    a memory; and
    a processor coupled to the memory and configured to:

when an authentication process of the communication device succeeds, establish the session with the communication device, receive, from the communication device, session information including an idle time period, the idle time period being a difference between a first time at which a new access is detected and a second time of a last access among past accesses by the communication device, receive, from the communication device, a request including a session ID identifying the session and time period information on a time period over which the communication device has been in a locked state, receive, from the communication device, an access retain time, the access retain time being a predetermined time interval, and determine, using historical information of access made by the communication device and the time period information, session identified by the session ID is valid when the difference between the idle time period and the time period over which the communication device has been in a locked state is less than the access retain time, transmit a response to the request to the communication device.

5. The control device according to claim 4, wherein the processor is configured to:

when receiving, from the communication device, another request including the session ID and not including the time period information, determine, in accordance with the historical information, whether or not the session identified by the session ID is valid, and when it is determined that the session is valid, transmit another response to the other response to the communication device.

6. The control device according to claim 4, wherein the processor is configured to, when the difference between the idle time period and the time period over which the communication device has been in a locked state is greater than the access retain time, determine that the session is invalid and make a request to the communication device for re-authentication.

7. A control method executed by a computer for managing a session with a communication device, the control method comprising:

when an authentication process of the communication device succeeds, establishing the session with the communication device;

receiving, from the communication device, session information including an idle time period, the idle time period being a difference between a first time at which a new access is detected and a second time of a last access among past accesses by the communication device;

receiving, from the communication device, a request including a session ID identifying the session and time period information on a time period over which the communication device has been in a locked state;

receiving, from the communication device, an access retain time, the access retain time being a predetermined time interval; and determining, using historical information of access made by the communication device and the time period information, the session identified by the session ID is valid when the difference between the idle time period and the time period over which the communication device has been in a locked state is less than the access retain time, transmitting a response to the request to the communication device.

8. The control method according to claim 7, further comprising when receiving, from the communication device, another request including the session ID and not including the time period information, determining, in accordance with the historical information, whether or not the session identified by the session ID is valid; and when it is determined that the session is valid, transmitting another response to the other response to the communication device.

9. The control method according to claim 7, further comprising:

when the difference between the idle time period and the time period over which the communication device has been in a locked state is greater than the access retain time, determining that the session is invalid and make a request to the communication device for re-authentication.

* * * * *